No. 752,600. PATENTED FEB. 16, 1904.
W. A. SINCLAIR.
DEVICE FOR AUTOMATICALLY CLOSING THE ORIFICES IN FISH BASKET COVERS.
APPLICATION FILED MAY 16, 1903.
NO MODEL.

Witnesses:
Wayne Simmons
Nettie Simmons

Inventor:
W. A. Sinclair

No. 752,600. Patented February 16, 1904.

UNITED STATES PATENT OFFICE.

WALTER A. SINCLAIR, OF SPRINGFIELD TOWNSHIP, KALKASKA COUNTY, MICHIGAN.

DEVICE FOR AUTOMATICALLY CLOSING THE ORIFICES IN FISH-BASKET COVERS.

SPECIFICATION forming part of Letters Patent No. 752,600, dated February 16, 1904.

Application filed May 16, 1903. Serial No. 157,508. (No model.)

*To all whom it may concern:*

Be it known that I, WALTER A. SINCLAIR, of the township of Springfield, county of Kalkaska, and State of Michigan, have invented a certain new and useful device to automatically close the orifice in a fish-basket cover when fish are inserted into the trout or other fish basket, of which the following is a specification.

My invention is a device to attach to fish-basket covers for the purpose of automatically closing the orifice in the cover used for the insertion of fish into the basket used to carry fish while fishing.

My invention consists of two pieces of metal or other substance hinged together, to one of which pieces I attach a spring in such manner that the other piece is held automatically in the same plane. The best way known to me at present for its use is to firmly attach the plate to which the spring is attached to the under side of the basket-cover by means of screws or bolts in such a position that the loose hinged piece or lid will be held by the spring directly under the orifice in the cover and nearly closing it.

What I claim for this device is, first, that when the fish is partially inserted through the orifice the free hinged piece or lid will press the fish against the other side of the orifice in such a manner that the fish cannot escape and all efforts of the fish to escape will hold it more firmly; second, that the orifice in the cover may be sufficiently enlarged to admit the largest fish without raising the cover. The orifice in the covers as now used is quite small to keep smaller fish from flopping out, which they sometimes do when the basket is partially filled, and this necessitates the raising of the cover to put in the larger fish.

In describing the invention in detail reference will be had to the accompanying drawing, forming part of the specification, wherein like characters denote corresponding parts in the several views, in which—

Figure 1:
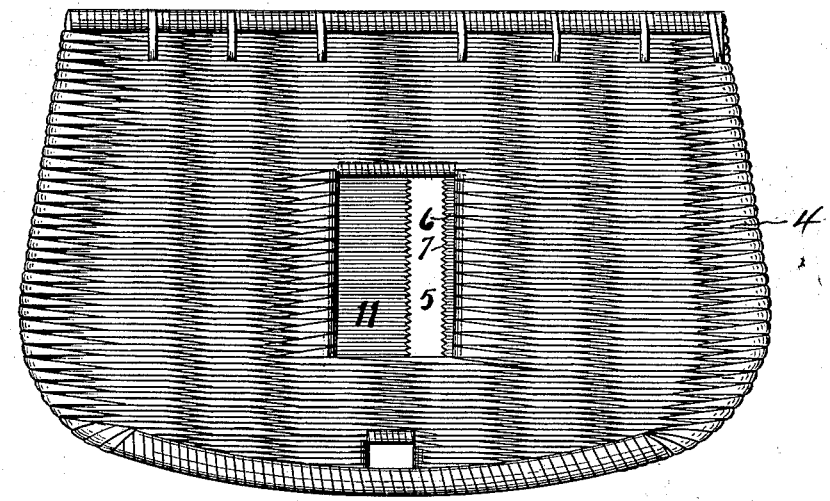
Figure 2:
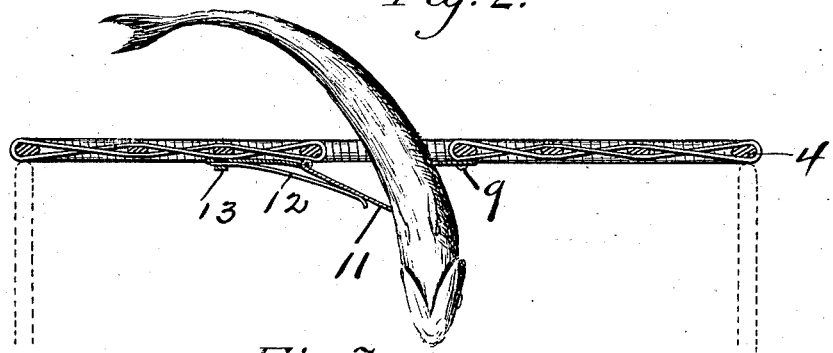
Figure 3:
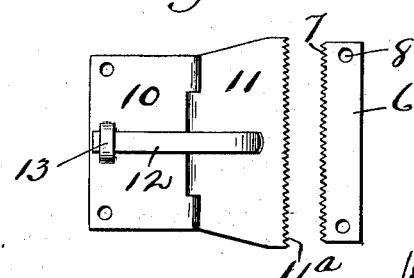

Figure 1 is a plan view of a basket having the invention applied. Fig. 2 is a sectional view of the cover. Fig. 3 is a plan view of the parts comprising the invention.

In the drawings, 4 denotes a basket-cover having an opening 5, one edge of which is provided with a plate 6, having a serrated edge 7. The plate has holes 8 for fastenings 9, whereby it is attached to the under surface of the cover with the serrated edge projecting into the cover-opening. A plate 10 is secured to the under surface of cover, and a guard 11 is hinged thereto, the said guard having a serrated edge 11$^a$ coacting with the plate 6 to engage and hold a fish. The plate 11 is held to guard the opening in the cover by means of the spring 12, which bears against the under surface of the guard and has its other end anchored in the loop 13.

What I claim, and wish to secure by Letters Patent of the United States, is—

In combination with a fish-basket cover having a hole, of a plate having a serrated edge, said plate being secured to the cover with the serrated edge extending over the edge of the hole, a plate secured to the cover, a guard pivoted thereto and extending over the edge of the hole opposite the serrated plate, and a spring bearing against the guard substantially as described.

In testimony whereof I have signed my name to this specification in the presence of two subscribing witnesses.

WALTER A. SINCLAIR.

Witnesses:
WAYNE SIMMONS,
M. N. LENNER.